May 13, 1958     L. MALAKOFF     2,834,110
COMPUTER
Filed March 16, 1953     2 Sheets-Sheet 1

INVENTOR
LOUIS MALAKOFF
BY
ATTORNEY

May 13, 1958  L. MALAKOFF  2,834,110
COMPUTER
Filed March 16, 1953  2 Sheets-Sheet 2

INVENTOR
LOUIS MALAKOFF
BY
ATTORNEY

United States Patent Office 2,834,110
Patented May 13, 1958

2,834,110

COMPUTER

Louis Malakoff, Brooklyn, N. Y.

Application March 16, 1953, Serial No. 342,768

3 Claims. (Cl. 33—1)

(Granted under Title 35, U. S. Code (1952), sec. 266)

The invention described herein may be manufactured and used by or for the Government of the United States of America for governmental purposes without the payment of any royalties thereon or therefor.

This invention relates to computers and is intended to eliminate tedious manual calculations to find the solution to a problem.

The invention provides an air intercept computer that is capable of taking information from the radar scope and using this information to find the course and speed of a target airplane. The radar operator normally takes the information from the radar presentation and finds the enemy aircraft's position, its true course and its speed and then vectors and guides his own interceptor aircraft to the enemy. The size of present equipment is cumbersome and the time consumed in completing a problem often renders the solution too late, as can readily be appreciated in these days of ultra high speed airplanes. By the computer of the invention, the time needed to solve a problem is reduced to seconds with the computer capable of being held in the hand of the operator.

Further, by slightly modifying the device, a computer to solve various vector problems is obtained.

The primary object of the invention is to provide a computer that will avoid the necessity for tedious manual calculations and that will enable the user to read directly the bearing and speed on the computer.

Another object of the invention is to avoid the use of cumbersome and complex equipment by reducing the required materials to a small frame to hold the required computer components.

Yet another object of the invention resides in the elimination of the extensive training necessary heretofore to train personnel in computing course and speed as well as the intercept vector. By this device, it requires only the ability to mark the positions of the target as they appear on the radar scope, and by properly aligning the computer components, read the solution directly from the computer.

And still another object of the invention is to provide a modified device that will be capable of solving vector problems.

Other objects and many of the attendant advantages of this invention will be readily appreciated as the same becomes better understood by reference to the following detailed description when considered in connection with the accompanying drawings wherein.

Figure 1:
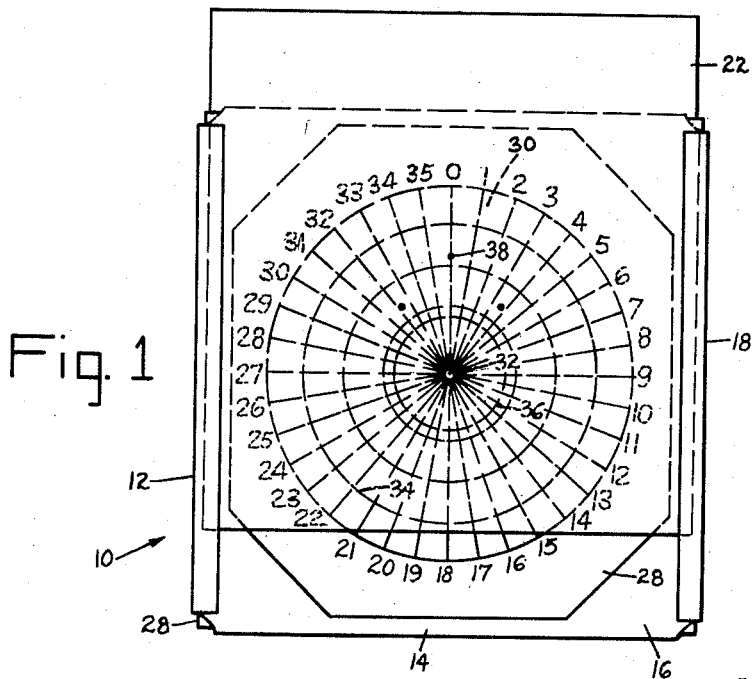
Figure 1 is a front elevation of a computer used to determine a target course and speed.
Figures 2, 3:
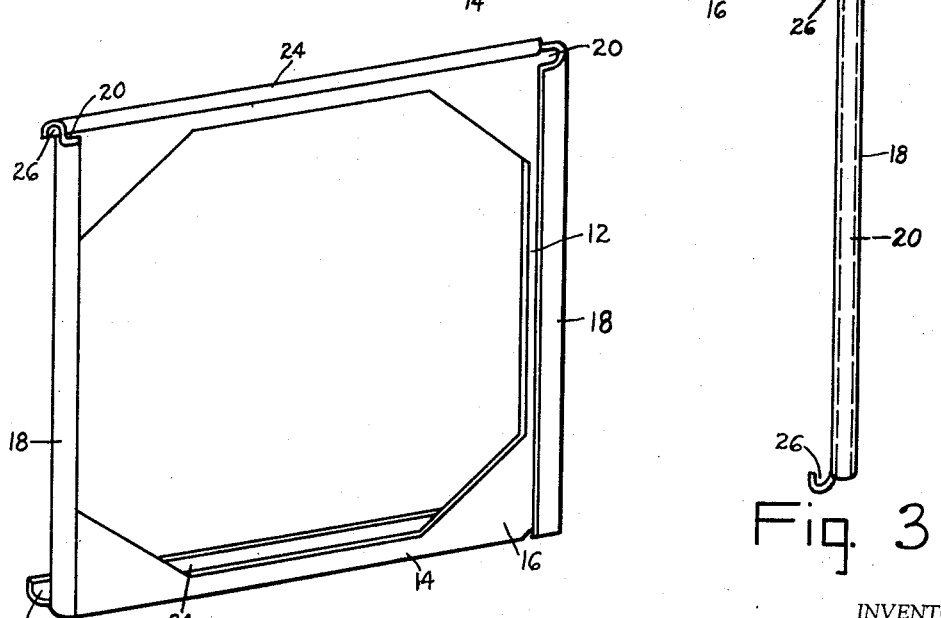
Figure 2 is a perspective view of the frame illustrating the channel construction.
Figure 3 is a side elevation of the frame of Figure 2.
Figure 4:
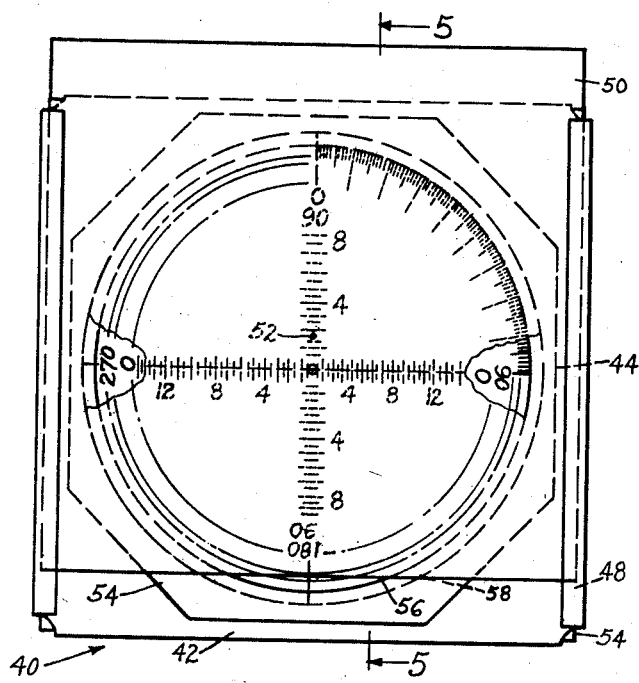
Figure 4 illustrates the frame of Figure 2 retaining a modified computer capable of solving vector problems, with parts shown in section.
Figure 5:
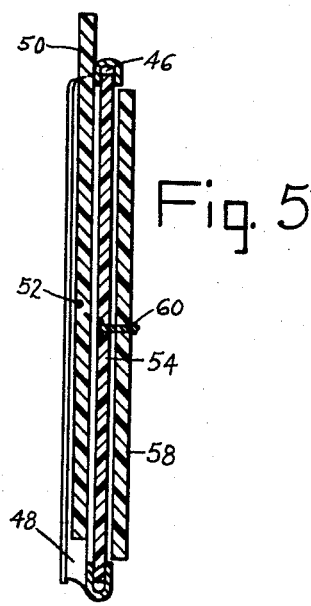
Figure 5 is a section taken on line 5—5 of Figure 4.
Figure 6:
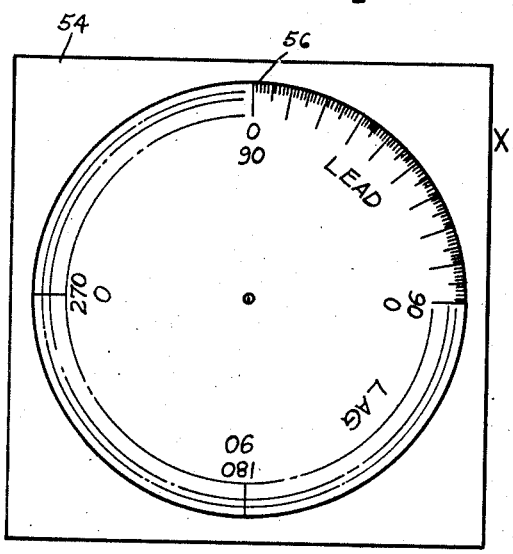
Figure 6 is a plan view of the 360 degree compass rose plate.
Figure 7:
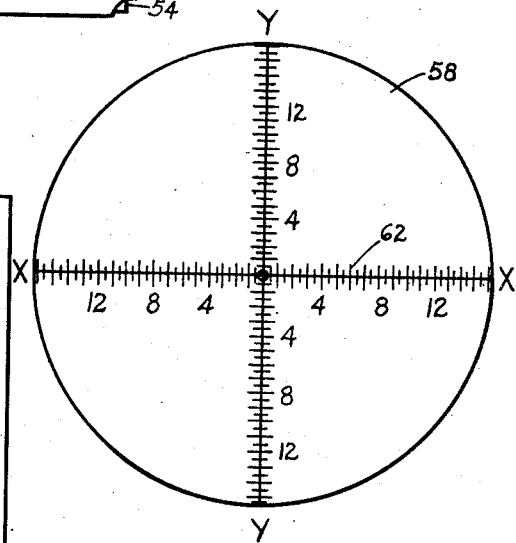
Figure 7 is a plan view of the disc carrying distance markings thereon.

Referring to the form of the invention illustrated in Figures 1–3, frame 10 comprises sides 12 and 14 to form a rectangular frame of sheet metal. Reinforcing corners 16 insure rigidity. Arcuate strips 18 extend integrally along the vertical length of sides 12 to form channel or track members 20. Tracks 20 are in spaced apart parallel relation and receive, for sliding movement therein, a transparent plate 22 of plastic or similar material. Arcuate strips 24 extend integrally along the horizontal length of sides 14 to form channel or track members 26. Tracks 26 are in spaced apart parallel relation and receive slidably therein transparent plate 28. Channels 20 and 26 are on opposite sides of frame 10 as can readily be seen in Figure 2.

Plate 28 represents the radar scope and is marked to indicate a 360 degree compass rose 30 extending radially from the axial center 32. Plate 28 is further marked with concentric rings or circles 34 to designate either speed or distance, depending on the problem to be solved. A special ring 36 is also marked on plate 28, for a purpose that will presently become clear.

Plate 22 is unmarked except for four dots or points 38 engraved thereon. These dots depict the cardinal headings and it will be noted that when plate 22 is superimposed on plate 28, dots 38 fall on ring 36. These dots simplify the use of the device by permanently representing the user's position relative to the center of the compass rose after a three minute interval and eliminate the necessity for extra crayon markings when a fixed airspeed is maintained. More or less dots could be used as desired.

The operation of the computer will be described in reference to target aircraft. Obviously, its use is not limited to the example being given since it is equally efficient for surface ships or other problems requiring a determination of true course and speed. Each ring 34 represents a predetermined ground speed in knots at a specified distance depending on the known maximum speed possible. On the device of Figure 1, each ring or circle 34 is made to represent a distance of 10 miles from the center 32, and also represents a speed of 200 knots. The radial distance between all circles 34 is the same. The normal cruising speed of the aircraft on which the computer is intended to be used is 140 knots. At this speed the aircraft will travel seven miles in three minutes.

It is desirable, in order to avoid plotting, to place a circle 36 at a radius which will provide a three minute or seven mile reference point. This distance of seven miles or 140 knots will definitely locate the circle 36 slightly inside the 10 mile circle 34. Also, it will be noted that when the plates 22 and 28 are in full superimposed relationship, the four dots 38 intersect the circle 36 at the 90, 180, 270 and 360 degree radials which are often termed the cardinal headings. The spacing and location of these four dots is such that when the plate 22 is placed directly and centrally over the rose plate 28, the four dots will all lie on the seven mile ring 36 at the four mentioned cardinal headings. Each dot will represent a seven mile distance from the center of the rose 30 when the plates are so aligned.

For the purposes of this problem, "reference aircraft" is used to designate the point from which computation will take place, and here applies to the friendly aircraft or airplane in which the computer is used. The cruising speed of the reference aircraft is known to be 140 knots. A three minute plot is ordinarily used. This means that the course of the enemy aircraft is followed on the radar scope for that time interval, after which the bearing and speed is computed. At a speed of 140 knots, the reference aircraft will travel seven miles in three minutes. Since this time and cruising speed is fixed for that airplane, it is permanently inscribed in the form of ring 36 on lower plate 28 to indicate the position of the reference craft after three minutes of travel. Obviously other distances computed for the specific type of aircraft used can be substituted. If desired, ring 36 may be eliminated. However, when operating with a specific type of reference craft, it is convenient to inscribe such line.

Assume now that the heading of the friendly or reference airplane is 60 degrees. The most convenient of dots 38 is then moved until it overlies the 60 degree radial line or bearing of campass rose 30 of plate 28 at the seven mile line 36. This represents the reference aircraft position in 3 minutes, and the sixty degree line will represent the course of the reference aircraft in moving from its initial to its second position during the three minute or seven mile interval. The center of the compass rose represents the initial position of the reference airplane, so that if a line were drawn on plate 22 between the center and the dot it would normally represent the path of the reference aircraft during the three minute interval. The ability for plates 22 and 28 to slide in their respective channels allows dots 38 to be placed on any bearing along the 7 mile speed ring 36.

When an unknown aircraft is first sighted on the radar scope, the time and its bearing and distance from the observer is noted. This position is marked, as by a grease pencil, on transparent plate 22 in exactly the same position seen on the radar. This mark is made while the dot 38 is on the 60 degree line at line 36 as explained above. At this instant the center of the compass rose represents the reference aircraft position and the pencil mark represents the position of the unknown aircraft. After three minutes have elapsed, the new position on the radar scope of the unknown aircraft is noted. This is marked on the bottom surface of rose plate 28. The first pencil mark and this second mark represent the first and second positions of the unknown aircraft. The second mark is made on plate 28 because it locates the unknown aircraft position relative to the reference aircraft has traveled three minutes in the 60 degree direction. Plates 22 and 28 are then slid verticaly and horizontally until the initial mark on plate 22 overlies the second mark on plate 28. It will be noted that cardinal dot 38 moves as plate 22 is moved to align the markings representing the unknown aircraft's positions. The position assumed by dot 38 provides the true course and speed of the unknown aircraft. This shifting of the plates correlates the initial and second positions of both aircraft so that the course vectors of the two are added to provide a reading which represents the third side of the vector triangle. The final position of the dot 38 relative to the center of the compass rose will give the course (or heading) and speed of the unknown aircraft. This may be read directly from the computer. The course will be the radial line between the selected dot 38 and the center 32, while the distance is read along the radial from the dot to the center.

Obviously, frame 10 could be constructed of any other suitable material, such as glass or plastic. Also, stiffening edges 16 could be eliminated. Also, the computer could be placed directly over the radar scope to obtain a low intensity background illumination from the rear for the markings on the transparent plates.

The frame is adapted for use with modified plates slidable therein whereby vector problems can be readily solved. Figs. 4–7 illustrate such device. Frame 40 is provided with parallel sides 42 and 44 and respective channels 46 and 48, exactly like the form described above. Transparent plate 50 is slidably retained within channels 48 and is unmarked except for a centrally located dot 52.

Transparent plate 54 is slidably retained within channels 46 and has etched thereon a compass rose 56 marked off in one degree increments from zero to 360 degrees to designate the lag or lead angle. For purposes of clarity, only one segment of rose 56 is shown in one degree increments in Figure 4. Circular disc 58 overlies plate 54 and is also transparent. Rivet 60 secures disc 58 to plate 54 for rotation thereon. Indicia 62 are marked along the X and Y axes of disc 58 to designate distance.

Assume a problem to determine the value of the impedance and the lag or lead angle. The known quantities are a resistance value of 4 ohms and a reactance value of 3 ohms.

To solve the problem by means of the vector computer, plates 50 and 54 are aligned so that dot 52 and rivet 60 coincide and the X and Y markers on disc 58 align with the zero and 90 degree positions on plate 54. The value of 3 is marked on the Y axis of plate 50. Plate 54 is moved in tracks 46 until central dot 52 overlies the fourth indicia on X marker 62. The hypotenuse is represented by the distance from the center of plate 54 to the first made mark on the Y axis of plate 50. Disc 58 is rotated until scale 62 intersects this mark. This gives both the hypotenuse value of 5 and an angle of about 37 degrees.

Obviously many modifications and variations of the present invention are possible in the light of the above teachings. It is therefore to be understood that within the scope of the appended claims the invention may be practiced otherwise than as specifically described.

What is claimed is:

1. A target computer comprising a frame, parallel vertical track means on one side of said frame, parallel horizontal track means on the opposite side of said frame, a first transparent plate slidably retained in said vertical track means, cardinal heading markings on said plate, a second transparent plate slidably retained in said horizontal track means, a 360 degree compass rose on said second plate, concentric speed ring indicia intersecting said rose, and a fixed speed ring indicia on said second plate, said cardinal heading markings overlying said fixed speed ring when the first plate is superimposed over the second plate.

2. A vector problem computer comprising a frame, parallel vertical track means on one side of said frame, horizontal track means on the opposite side of said frame, a first transparent plate slidably received in one of said track means, a second transparent plate slidably received in the other track means, angle indicating means on said second plate to give the lag or lead angle, a disc rotatably secured to said second plate, and distance indicia on said disc.

3. The combination of claim 2 wherein the angle indicating means comprises a compass rose having zero and 90 degree positions and said distance indicia comprises a vertical and a horizontal line marked for distance, said vertical and horizontal lines overlying said zero and 90 degree positions at the start of a problem.

References Cited in the file of this patent
UNITED STATES PATENTS

| | | |
|---|---|---|
| 1,087,445 | Herrick | Feb. 17, 1914 |
| 1,484,176 | Haimes | Feb. 19, 1924 |
| 1,937,831 | McCollum | Dec. 5, 1933 |
| 2,244,181 | Wood | June 3, 1941 |
| 2,334,725 | Perkins | Nov. 23, 1943 |
| 2,486,913 | Bessiere | Nov. 1, 1949 |
| 2,471,450 | Reza | May 31, 1949 |

FOREIGN PATENTS

| | | |
|---|---|---|
| 151,441 | Austria | Nov. 10, 1937 |
| 495,167 | Belgium | Apr. 29, 1950 |